United States Patent [19]

Robbins

[11] Patent Number: 5,033,702
[45] Date of Patent: Jul. 23, 1991

[54] HOSE SUPPORT FOR WASTE DISPOSAL SYSTEMS

[76] Inventor: Daniel T. Robbins, 368 E. Lombardy La., Banning, Calif. 92220

[21] Appl. No.: 512,440
[22] Filed: Apr. 23, 1990
[51] Int. Cl.⁵ .............................................. F16L 3/00
[52] U.S. Cl. ...................................... 248/83; 248/80
[58] Field of Search ................ 248/80, 82, 688, 81, 248/83

[56] References Cited

U.S. PATENT DOCUMENTS

| | | | |
|---|---|---|---|
| 3,819,137 | 6/1974 | Smith | 248/80 |
| 4,194,711 | 3/1980 | Winton | 248/83 |
| 4,403,758 | 9/1983 | Burt | 248/83 |
| 4,715,570 | 12/1987 | Mashuda | 248/83 |

Primary Examiner—Robert L. Wolfe
Attorney, Agent, or Firm—I. Louis Wolk

[57] ABSTRACT

Apparatus is described herein for supporting a length of hose extending from an outlet such as the waste disposal outlet of a recreational vehicle to a disposal inlet. The apparatus includes a trough-like support which may be in sections supported by vertical members removably clamped to bottom end edge portions of the trough-like support in an inclined position from the outlet to the inlet. The vertical members are designed with horizontal U-shaped clamping portions positioned with the end edges of the trough-like support clamped between the legs of the "U".

11 Claims, 1 Drawing Sheet

U.S. Patent
July 23, 1991
5,033,702
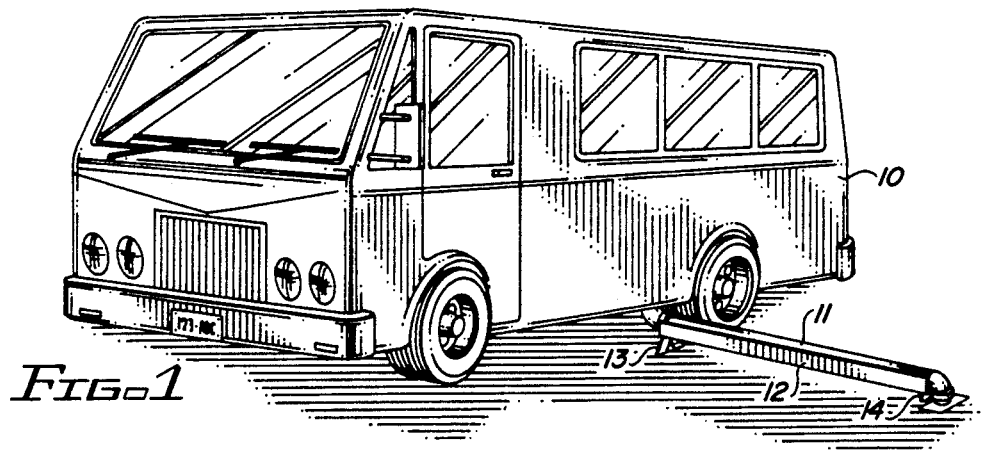
FIG. 1
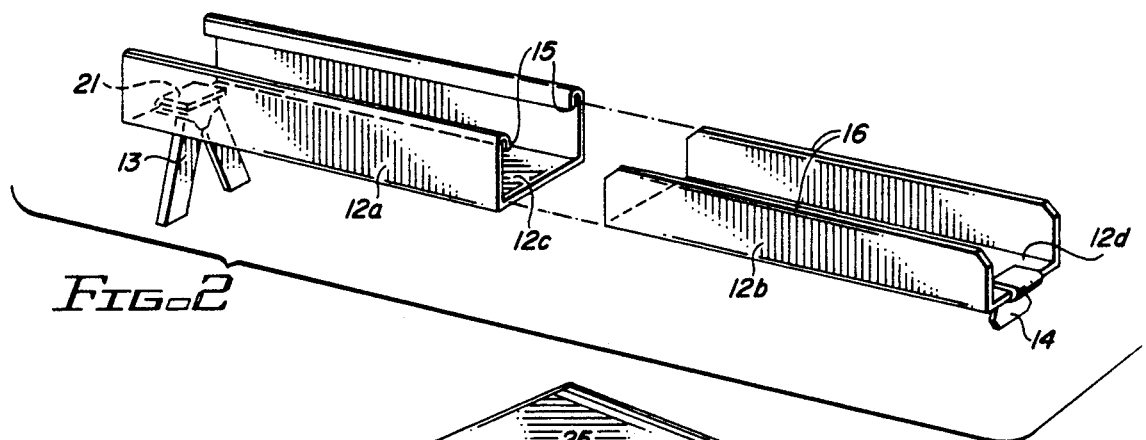
FIG. 2
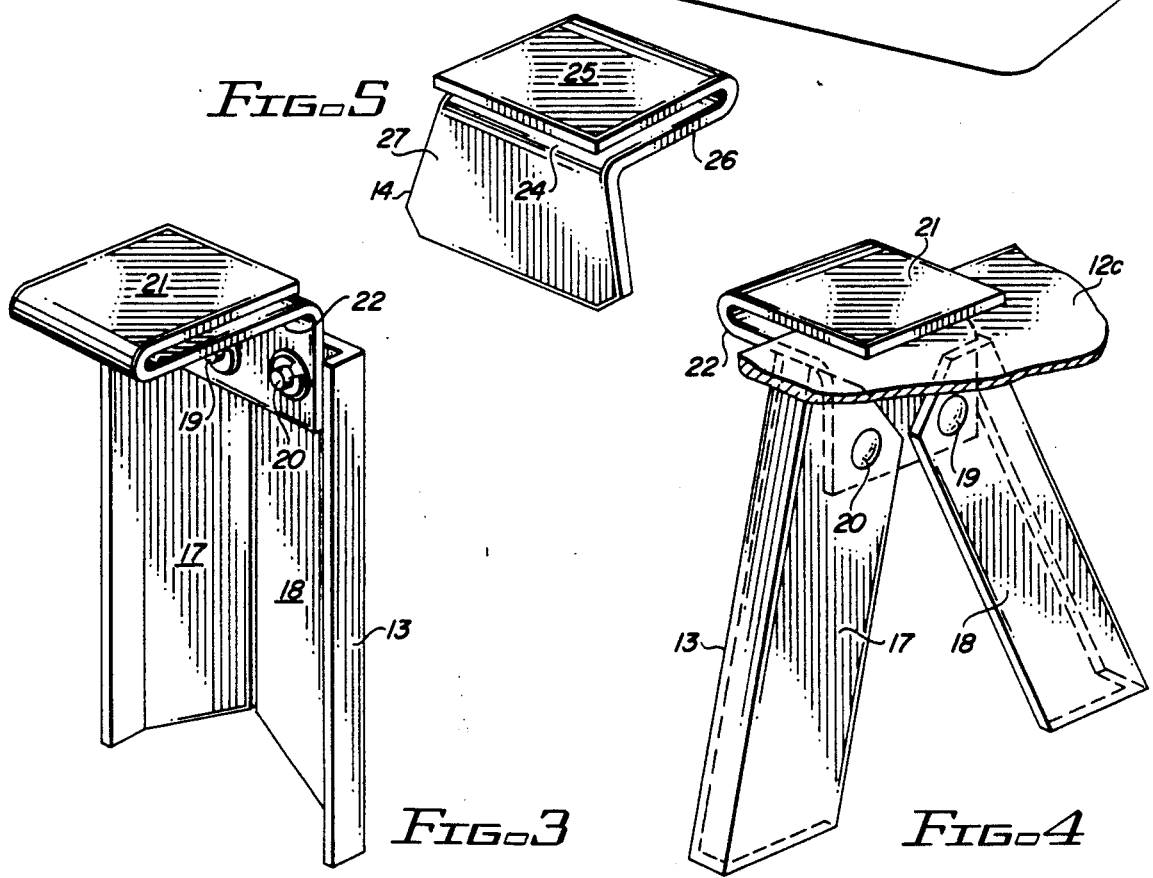
FIG. 5
FIG. 3
FIG. 4

HOSE SUPPORT FOR WASTE DISPOSAL SYSTEMS

BACKGROUND OF THE INVENTION

The present invention relates to an improved means for supporting waste disposal hose positioned between a disposal outlet and the inlet of a waste collecting means, and particularly to a novel support means adapted to support hose in an inclined position to facilitate drainage and at the same time support such hose above the ground surface or otherwise to avoid abrasion and/or contamination thereof. It relates more particularly to a means for providing such support composed of segments which can be easily assembled and disassembled at the point of use. It is especially suitable for providing support and protection to flexible hose, either straight or corrugated, such as used for the dumping or disposal of waste products from disposal tanks such as are commonly used in recreational vehicles or RV's as they are generally known.

In U.S. Pat. No. 4712755 of which applicant is a co-inventor, the conventional practice in using discharge hose temporarily attached to waste storage containers of RV's, for example, and the problems associated therewith are discussed in detail. Such problems are related to at least in part to the flexible nature of the hose used which is frequently of convoluted or corrugated construction. As described and claimed in that patent, the hose is supported while connected to the outlet of the RV's waste storage system by means of a pair of connected rails detachably interlocked and suitably extensible and supported from beneath at a given point by means of a slidable bracket.

It has been found that appropriate support and drainage for such a rail system can be provided in a simple and easily assembled and disassembled manner by certain improvements and modifications such as described below.

SUMMARY OF THE INVENTION

Applicant has found that a hose supporting means in the form of a U-shaped channel which partically encloses the hose, dimensioned to conform to the diameter as well as the length of the hose can be supported at each end by means of separate vertical supporting members attachable at each bottom end edge of the channel, which is formed with a flat bottom surface and raised side walls. Such vertical supporting members are preferably of different lengths so that a longer member may be attached at the end adjacent to the RV disposal outlet and a shorter member atttached to the end adjacent to the hose outlet to impart a slope to the hose support and assure proper drainage. While the hose support channel may be provided in a single section, it is generally preferable to make such channel in the form of two or more slidably interlocking members which are therefore extensible to a desired length and which are also separable into short sections for convenient storage. A simple form of interlocking means is by turning in or crimping the parallel upper edges of one section to allow a second section with straight edges to be slidably inserted and supported over and within the first section in engagement with the side walls and in turned edges thereof. These channels are generally formed of galvanized sheet steel of suitable gauge but other materials such as rigid plastic or aluminum sheet may be used.

In order to provide raised support for these channels applicant has designed members of suitable length provided at one end with a bent-over segment in the form of a horizontal "U" with its legs closely spaced apart sufficiently to frictionally engage the bottom and edges of the channel to raise it from the ground surface. One form of such support is provided with a pair of legs one or both of which may be hinged to be spread apart to provide a V-support and another form in which the support is formed in one piece with the described horizontal "U" shaped segment formed at one end.

In practice it has been found desirable to position the hose support channels in raised position at the RV disposal outlet and supported at a lower level adjacent to the hose outlet to assure proper drainage.

The trough-like hose support described herein may be formed with sloping rather than straight sides and shaped to provide lateral as well as bottom support for the hose to retain it in proper position, for example, as shown in FIG. 4 of Pat. No. 4712755 referred to above. In a typical installation the channel or trough may be in two sections of 22 gauge galvanized iron each section being 36" in length while the vertical supports may be about 7-8" in height for the longer support and about 3-4" in height for the shorter support. The vertical supports are formed of heavier gauge galvanized iron or steel or aluminum suitable for bending to the desired configuration. Of course, other lengths may be selected to provide the degree of support and inclines required for any given installation.

BRIEF DESCRIPTION OF THE DRAWINGS

The present invention may best be understood with reference to the accompanying drawings in which FIG. 1 is a view in perspective of a recreational vehicle having a disposal hose attached and supported by means of the present invention.

FIG. 2 is an exploded side elevation view showing the components of the invention with support channels aligned for slidable assembly.

FIG. 3 is a view in perspective of one form of a vertical supporting means for the hose supporting channels having a pair of legs folded together.

FIG. 4 is a view in perspective corresponding to FIG. 3 in which the legs are drawn apart in supporting position.

FIG. 5 is a view in perspective of another form of vertical support formed in one piece.

DESCRIPTION OF THE PREFERRED EMBODIMENT

Referring to FIG. 1, the assembly of the present invention is shown associated with a conventional RV 10 wherein a hose 11 is supported on a channel or trough-like member 12 which in turn is supported at each end in an inclined position by means of legs or supports 13 and 14 which are described in greater detail below.

While channel 12 is illustrated as a unitary member, it is generally preferable that it be in the form of at least two interconnected segments for convenience in storage. As shown the hose is connected at its raised end to the waste outlet of the RV and at its lower end to the inlet of a waste disposal pit.

FIG. 2 illustrates in greater detail a form of trough-like support in two sections 12a and 12b.

As shown the channel members are formed with flat bottom surfaces 12c and 12d to which leg supports 13 and 14 are respectively attached as discussed further below. The two channel sections are designed to be slidably joined by sliding side walls 16 of 12b within corresponding side walls of 12a and with the intergaging portions of 16 retained by the turned in upper edges 15 of section 12a. Of course, instead of forming the channel member in two or more sections, it can be provided in a single section where its length is not a deterrent.

In FIGS. 3 and 4 is illustrated one form of leg support which is easily affixed and removed and which is designed to clip over the end of the flat bottom portion of the channel. As shown the unit 13 is formed with a pair of leg members 17 and 18 riveted by means of rivets 19 and 20 to a clip or clamping member formed by bending a strip of sheet metal into a horizontal U shape with upper and lower legs 21 and 22 defining a slot or opening 23 spaced to conform closely to the thickness of the flat bottom portion of channel 12, i.e. 12c or 12d of FIG. 2. In a preferred form leg member 17 is hinged so that it can be folded against 18 by making rivet 19 loose enough to function as a shaft while rivet 20 can be tight to prevent leg member 18 from rotating. When it is desired to attach the vertical support 13 legs 17 and 18 are spread apart and U-shaped clamp 21-22 is pressed over the end of the bottom edge 12c as shown in FIG. 4, of channel 12a, for example, where the length of 13 is selected so as to elevate the channel and hose at the RV waste outlet. The purpose of being able to spread legs 17 and 18 apart to form an inverted V-type support is to provide greater lateral stability when in use. As shown in FIG. 2 leg support 13 is in position with the upper lip 21 positioned over the edge of 12c.

In FIG. 5 a leg support 14 is shown in the form of a sheet metal member with one end beat to form a horizontal U-shaped portion with upper and lower lips 25 and 26 defining a slot 24 dimensioned to closely conform to the diameter of the bottom surface of the channel member. This will provide a leg having a desired length 27 such that it can be used, for example, at the lower end of the channel adjacent to the waste disposal inlet. On the other hand this unit may be formed to be of greater length and can be utilized as well at the upper end of the channel support in place of the hinged leg unit shown in FIGS. 3 and 4.

I claim:

1. Waste disposal means comprising a storage tank outlet and a disposal tank inlet wherein said outlet is in a relatively elevated position with respect to said inlet and laterally spaced therefrom and wherein a hose connects said outlet to said inlet, means for supporting said hose which comprises an elongated channel conforming substantially in length to that of said hose, said channel having a bottom surface with edges at each end thereof and upwardly extending side panels supporting and partially enclosing said hose, means for verically supporting said channel over the end thereof adjacent to said outlet whereby said channel and the hose supported thereby are inclined downwardly toward said inlet, said means for vertically supporting said channel comprising an upright leg member supporting a pair of horizontally positioned clip members spaced apart one above the other the spacing of which approximates the thickness of the bottom edge of said channel above and below said edge for firm engagement therewith, said edge being thereby sandwiched therebetween.

2. Waste disposal means according to claim 1 wherein said spaced apart members are the sides of a U-shaped clip.

3. Waste disposal means according to claim 2 wherein the said vertical supporting means comprises a pair of legs of the desired length which support said horizontally positioned members said legs being anchored thereto and spread apart to form an inverted V-form of support.

4. Waste disposal means according to claim 3 wherein at least one of said legs is hinged to said horizontal members to permit said legs to be folded together.

5. Waste disposal means according to claim 2 wherein said U shaped clip member is integrally formed with a vertically extending leg or base portion having a length to sufficiently provide a desired degree of elevation.

6. A vertical elevating support member for a trough like channel having end edges at the bottom thereof adapted to engage an end edge of said channel over the bottom edge thereof, which comprises a vertical leg the upper position of which is in the form of a pair of horizontal, vertically spaced apart members one above the other, the spacing and dimensions of which are selected so that they conform to the said bottom edge of said channel being thereby adapted to firmly engage and support said channel at the end edge thereof.

7. An elevating support member according to claim 6 wherein said horizontal vertically spaced apart members are in the form of a U-shaped segment.

8. An elevating support member according to claim 7 wherein said U-shaped segment is anchored to a pair of spaced apart legs.

9. An elevating support member according to claim 7 wherein said U-shaped segment is integrally formed with a depending leg portion.

10. An elevating support member according to claim 8 wherein at least one of said legs is hinged to said V-shaped member and is foldable against the other leg 11. Waste disposal means according to claim 1 wherein the bottom surface of said channel is flat at the end thereof and wherein said clip members are also flat for engagement of said channel over the flat end of the edge thereof.

* * * * *